Oct. 31, 1961  H. CLAAS  3,006,125
COMBINE HARVESTER AND DRIVE MOUNTING THEREFOR
Filed May 11, 1959  2 Sheets-Sheet 2
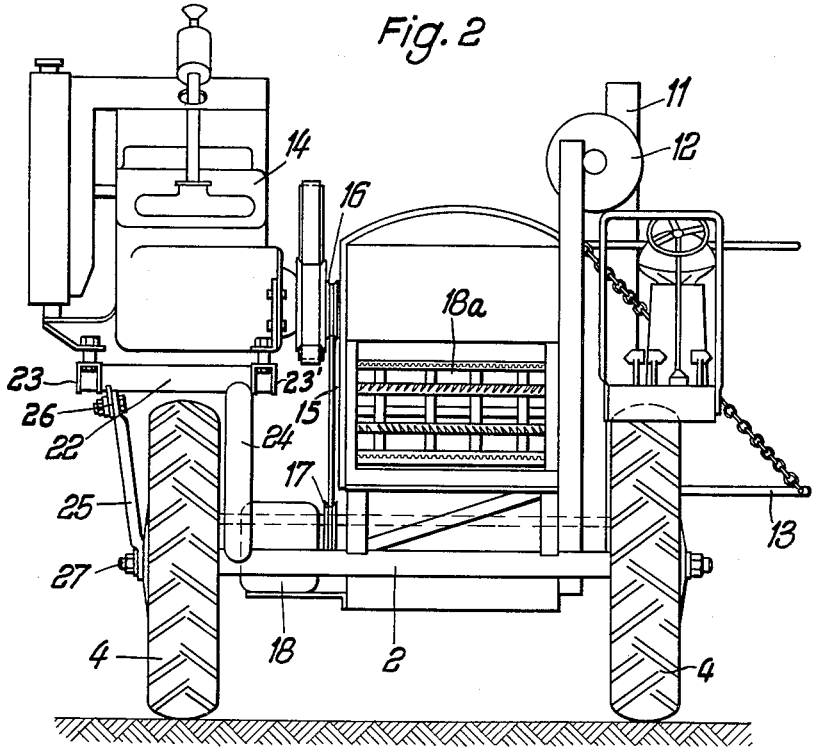
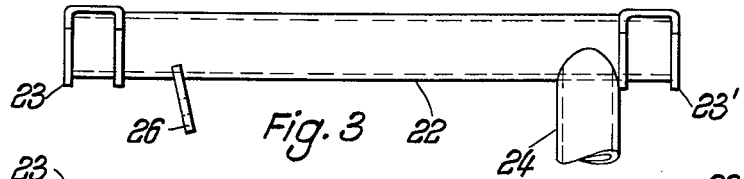
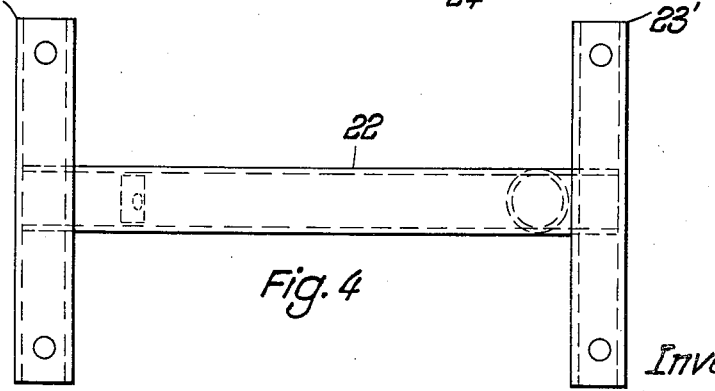
Inventor:
HELMUT CLAAS
BY C. P. Goepel
his ATTORNEY

United States Patent Office 3,006,125
Patented Oct. 31, 1961

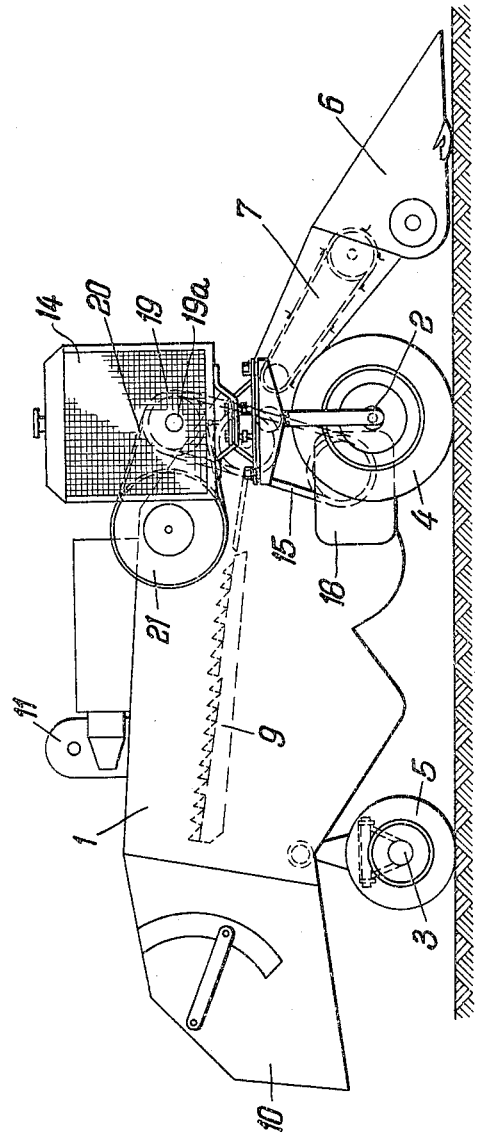

3,006,125
COMBINE HARVESTER AND DRIVE
MOUNTING THEREFOR
Helmut Claas, 4 AM Kattenpatt, Harsewinkel,
Westphalia, Germany
Filed May 11, 1959, Ser. No. 812,208
Claims priority, application Germany May 12, 1958
1 Claim. (Cl. 56—20)

This invention relates to a special arrangement of the drive motor or engine on a self-propelled combine harvester.

A wide variety of factors may govern the positioning of the engine on a self-propelled combine harvester. For example, the practice is known of mounting the engine in the immediate vicinity of the front drive axle beneath the combine harvester body. This arrangement provides an excellent positioning of the centre of gravity, whilst at the same time the disposition of the drive transmission means is compact. In this case, however, difficulties of maintenance arise since the engine is completely enclosed structurally from above and, with regard to cooling, cleaning and possible repair access is most inconvenient.

In many forms of combine harvester construction it has therefore been considered advisable to accommodate the engine on the combine harvester body, since this offers better cooling and convenience in maintaining the engine.

Moreover, the lateral arrangement of the engine on the combine harvester body is known, not only in the case of tractor-drawn machines but also in the case of self-propelled machines, the body of which is mounted on a motor-driven chassis, the engine being required as an auxiliary motor. In such cases the engine is generally arranged to form a counterweight to the filling platform or grain-sifting device situated on the opposite side of the combine harvester body. The present invention relates to a self-propelled combine harvester in which the drive motor or engine is mounted in such a manner that not only is the centre of gravity well-chosen but, in addition, the disposition of the drive transmission means for the vehicle and for the threshing mechanism is convenient. For this purpose it is proposed to mount the engine with its mounting over one of the rubber-tyred drive-wheels, so that the entire weight of the engine is supported upon the front axle.

This arrangement offers the following advantages. Since the engine is no longer mounted directly upon the combine-harvester body, no special reinforcement of the framework of the body is necessary. Thus, the vibration of the engine during operation is no longer transmitted directly to the harvester body but is absorbed by the rubber tyre of the drive-wheel. The engine mounting may be positioned relatively close to the drive-wheel. Consequently, in addition to the advantageous positioning of centre of gravity, the engine is easily accessible for maintenance purposes. Mounting and dismounting of the engine may also be asily carried out, so that, on completion of the threshing operations, the engine may also be employed as stationary drive means for other purposes. By this means therefore the engine is employed to the best advantage.

An embodiment of the invention is shown diagrammatically in the accompanying drawings, in which:

FIG. 1 is a side-elevation view of the combine harvester with drive motor mounted laterally;

FIG. 2 is a front elevation view of the combine harvester, the cutter mechanism and elevator having been removed;

FIG. 3 is a front view of the engine mounting, on a larger scale;

FIG. 4 is a plan view of FIG. 3.

The body 1 of the combine harvester is supported on the front axle 2 and rear-steerable axle 3 fitted with rubber-tyred wheels 4, 5 respectively. The grain is conveyed to the threshing drum 18a by way of the cutter mechanism 6 followed by the elevator 7. The straw passes over the shaker 9 into the built-on straw press 10. The threshed grain is conveyed by the elevator 11 from the threshing drum 18a to the grain-collecting device 12 which is supplied by a laterally-situated filling-platform 13. Since this part of the apparatus is well known in the art and does not constitute the subject of the present invention, it is indicated merely diagrammatically in the drawing. The engine is situated, as a counterweight to said filling-platform, on the opposite side of the combine harvester body and serves as drive means for the ground wheels and also for the threshing mechanism in the following manner: The vehicle is driven from the engine drive shaft 19a, by way of a transmission belt 15 and pulleys 16, 17 and of the gear-box 18, from which the power is transmitted to the drive wheels 4. The transmission consisting of the elements 15, 16 and 17 may be an adjustable V-belt transmission well known in the art and not illustrated in detail in the drawings. The drive for the threshing mechanism is transmitted from the engine drive pulley 19 keyed upon the engine drive shaft 19a, preferably by way of a flat belt 20, to the belt pulley 21. The engine mounting comprises a horizontal tubular member 22 carrying at its extremities U-shaped brackets 23, 23'. The engine mounting is supported by the tubular support member 24 and also by the connecting strut 25 which is secured to the plate 26 welded to the engine mounting and rests upon the wheel bearing spindle 27.

The tubular support member 24 is welded on the front axle 2 and carries the engine mounting which comprises the tube 22 arranged horizontally and connected to the tubular support member 24. The tube 22 is provided with the two U-shaped brackets 23 and 23' welded to the extremities thereof and carrying the base of the engine 14 which is screwed thereon. The strut 25 upon the front axle constitutes an additional support member which is located outside the drive wheel 4 and which connects the engine mounting 22 to the wheel bearing spindle 27 of the front axle 2.

I claim:

In a self-propelled combine harvester, a front axle, two rubber-tired drive wheels carried by said front axle, grain receiving means located upon one side of the harvester adjacent to one of said wheels, a driving engine, a mounting carrying said engine, a tubular support extending along one side of said other drive wheel and having a lower portion mounted upon said front axle and an upper portion connected with said mounting, a connecting strut extending along the other side of said other drive wheel and having a lower portion mounted upon said front axle and an upper portion connected with said mounting, said support and said strut carrying said mounting to support said engine directly above the other drive wheel, the center of gravity of said engine being located vertically substantially directly above the center of said other drive wheel, and a drive operatively connecting said engine with said front axle.

References Cited in the file of this patent
UNITED STATES PATENTS

| | | |
|---|---|---|
| 2,743,784 | Karlsson | May 1, 1956 |
| 2,754,652 | Gilder | July 17, 1956 |
| 2,790,291 | Hintz | Apr. 30, 1957 |